Sept. 20, 1938.  L. PLANSKOY  2,130,777

METHOD FOR THE PRODUCTION OF COMPOSITE IMAGES

Filed Dec. 20, 1935

Leonti Planskoy
INVENTOR his ATT'Y.

Patented Sept. 20, 1938

2,130,777

UNITED STATES PATENT OFFICE 2,130,777

METHOD FOR THE PRODUCTION OF COMPOSITE IMAGES

Leonti Planskoy, Paris, France

Application December 20, 1935, Serial No. 55,331
In France December 21, 1934

2 Claims. (Cl. 88—16)

For the production of composite images, in which at least two partial images taken separately are combined together, it is a matter of known practice to employ a mask which serves to conceal one of the partial images when copying or projecting the second partial image upon a sensitive surface, in such way as to preserve the unexposed emulsion in the parts adapted for exposure by copying or by projecting, through the first partial image. If the partial image to be concealed is a negative, its corresponding mask will be a positive, and inversely, so that the partial image and its mask will be necessarily upon different films, which have been subjected to different treatments and have thus suffered from shrinkage and distortions of a different nature. For this reason, the partial image and its mask can hardly ever be exactly superposed, and would thus very rarely produce a composite image which is perfectly sharp and is not surrounded by a black or white border. This border may also be produced not only by the different contractions of the films, but also by the diffusion and the irradiation of the image in the sensitive layer during the printing, and thus the relative sizes of the mask and of the image from which it is printed are not optically the same. This distortion cannot be compensated optically, since the irradiation is proportional to the amount of light which is received by the layer.

On the other hand, even admitting that the image and the mask can be exactly superposed, the methods now in use for combining the images do not permit of obtaining absolutely perfect results. In order to provide for a relative adjustment of the image of the background, of the image of the subject and of its mask, it is necessary to employ a system of optical printing. If the mask is placed in contact with the partial image of the background and is projected upon an unexposed sensitive film, the focusing done upon the mask will not be suitable for the partial image of the background, and if the focusing is done upon the partial image of the background, it will no longer be suitable for the mask, and this cannot thus be superposed upon its corresponding partial image, so that in the composite image, the image of the subject will be surrounded by a border, or there will be a lack of sharpness in the part representing the background.

The present invention, which has for its object to obviate the above-mentioned drawbacks and to obtain a composite image the components of which are exactly superposed, is based upon the phenomenon of the destruction of the latent image, which has some similitude with the effect known as the "Herschel effect", by which a certain luminous energy is capable of destroying a latent image, and this destruction can be facilitated by a preliminary treatment of the sensitive emulsion, for instance desensitizing by colouring matter, to which bromide can be added or not. This luminous energy may preferably consist of radiations having a long wave-length, but the spectrum character of these radiations may vary with the preliminary treatment to which the sensitive emulsion has been subjected. Moreover, this destruction of the latent image is not accompanied by a loss of sensitiveness of the emulsion.

The present invention has for its object a method for the production of composite photographic or cinematographic images, which is chiefly characterized by the fact that on a latent photographic image produced upon an emulsion which has been preliminarily treated in order to facilitate the photo-chemical destruction of the latent image, one destroys this latent image locally, in a determined region by means of a light, the spectrum character of which permits the destruction of this latent image (preferably a light having a long wave-length), and another latent image is formed in this same region, the sensitive layer being only developed after the formation of this second latent image.

Due to this method, and as it will be shown further in detail, I avoid the drawbacks due to the different contractions of the positive and negative films, to the distortion caused by the irradiation and the diffusion of the images, to the simultaneous focusing of several optical systems, and to the transfer of graininess, scratches or other defects, to the composite image.

Further characteristics and advantages of the invention will be disclosed in the following description.

Three examples of execution of the process according to the invention will be hereinafter set forth, with reference to the accompanying drawing, in which.

Figure 1:
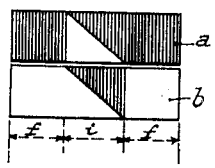
Figs. 1, 3, 4, 5, 6 and 7 represent, in section, films showing diagrammatically the images which have been formed upon these films.

In the first example, it will be supposed that it is desired to form a composite image by the use of a subject, of which a negative has been taken upon a white or light-coloured background which is strongly lighted, and of a landscape which is relatively little lighted, of which a latent positive image is separately produced upon a sensitive emulsion, and it will be supposed that the lighting has been chosen in such way that the part of the latent positive image of the landscape which would have the greatest opacity if said latent image were developed will have its sensitiveness restored by light passing through the portion of greatest opacity of the negative of the subject. In order to produce a composite image in which the image of the subject is located in a given region of the landscape, the operator first subjects the corresponding region of the emulsion carrying the latent image of the landscape to the action of red light through the negative of the subject, which destroys the latent image of the landscape in the region considered, by reason of the aforesaid supposition. This same region of the emulsion is then subjected to the action of blue light through the same negative of the subject, thus producing in this region a latent positive image of the subject. It is simply necessary to then develop the sensitive emulsion in order to obtain the composite image which is desired. It will be noted that in this manner, the use of masks is avoided, and also distortion by irradiation is prevented.

According to a second example, the operator places the subject before a background which is practically monochromatic and is strongly lighted, for instance a blue background, and makes the exposure upon a sensitive film by the use of a camera for cinematography in two colours which forms two images, geometrically alike, from a given point of view, so as to obtain two negative images of the subject, one of these negative images being direct and taken either directly without a light filter, or through a light filter giving a correct reproduction of the subject, whereas the other negative image is selected, and is taken through a light filter whose colour is complementary to the colour of the background, that is, in the example chosen, through an orange-red transmitting filter. The operator develops the two images thus formed on the film, thus obtaining two negative images of the subject, one on an opaque background, which is the direct negative, and the other upon a transparent background, which is the selected negative. These two negatives may be respectively represented in section by the bands $a$ and $b$ in Fig. 1, in which the regions $ff$ represent the uniform background, opaque or transparent, whilst the region $i$ represents diagrammatically the degrees of opacity due to the image, the degrees of opacity being directly proportional to the degrees of brilliancy of the subject. By way of example, the following arrangement may be used. By means of a mirror or prism 1 adapted for transmission and reflection (Fig. 2), the operator places two guideways 2 and 3 on the one hand and a guideway 4 on the other hand, in planes which are conjugate with reference to the two optical devices 5 and 6 respectively. In the guideway 2 he places the film carrying the negatives $a$ and $b$ of Fig. 1, in the guideway 3 he places a positive plate 9 of the landscape, and in the guideway 4 he places the unexposed sensitive film 10 which is treated for the photochemical destruction of the latent images and is adapted to receive the composite image. At 7 and 8 are disposed the luminous sources adapted to illuminate the films in the guideways 2 and 3 respectively. The operator then carries out the following operations.

Figure 3:

1. He exposes the sensitive film of the guideway 4 to a source of blue light placed at 7 through the negative $b$ of the guideway 2. This will form on the sensitive film a latent image which, if it were developed, would give a positive image $g$ of the subject on a black background, as shown diagrammatically in Fig. 3.

Figure 4:

2. He then exposes the film 10 of the guideway 4 to a source of red light placed at 7 through the negative $a$ of the guideway 2. As this negative is on an opaque background, the red light will not reach the sensitive film 10 in the part corresponding to the background. On the contrary, the red light passing through the transparent parts of the negative $a$ corresponding to the shadows of the subject, will destroy the positive latent image of the subject formed during the exposure to the blue light. This will afford, diagrammatically, a section of film $h$ analogous to what is shown in Fig. 4.

Figure 5:

3. He then exposes the sensitive film 10 to a source of red light placed at 8, through the positive film 9 of the landscape; the central part of the film 10 adapted to receive the image of the subject will remain unchanged, whilst the red light passing through the transparent parts of the film 9 corresponding to the light parts of the landscape, will destroy the fogged portions in the corresponding parts of the background in the sensitive film 10, thus forming a latent positive image $k$ of the landscape, as shown in Fig. 5.

Figure 6:

4. Finally, he exposes the sensitive film 10 to a source of blue light placed at 7 through the negative $a$. He leaves intact, upon the sensitive film, the latent image of the landscape, and forms, in the central part, a latent positive image $j$ of the subject, as shown in Fig. 6.

It is then simply necessary to develop the sensitive film 10 in order to obtain the desired composite image.

It will be noted that as the direct negative and the selected negative of the subject are formed on the same film, this will reduce to a minimum the differences in the contraction or other distortions which take place in different films, for on the one hand, the negatives formed on the same film are developed at the same time and are subjected to exactly the same treatment, and on the other hand, the two negatives occupy, on the film, very small adjacent surfaces.

Figure 2:
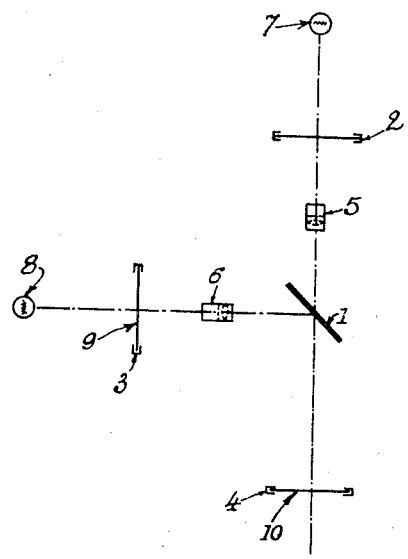
Fig. 2 shows diagrammatically an example of the arrangement adopted in order to produce a composite image.

An arrangement different from the one shown in Fig. 2 may be adopted, by the use of ordinary optical printing devices, and in this case the operator performs first the aforesaid operations 1 and 2 with the negative $a, b$ in the device; he then places the positive of the landscape in the device and performs the operation 3; finally, he replaces the negative $a, b$ in the device, and performs the operation 4.

Figure 7:

According to a third example of the process in conformity with the invention, the operator forms upon the same film two negatives $a$ and $b$ of the subject, as was done in the preceding example (Fig. 1). He then forms on another sensitive film which is treated for the photochemical destruction of the latent images, two intermediate images $c$ and $d$ (Fig. 7). One of these images $c$ is obtained by exposing one of the image areas of the sensitive film to a blue light, which uniformly affects the emulsion in this area, and then he exposes this same area to red light through the negative $a$, so that this area will carry the latent negative image of the subject upon a background affected by light. The other image $d$ is obtained by exposing another image area of the sensitive film to a blue light through the negative $b$, and this will give in the said area a latent positive image upon a fogged background.

After development, this film will carry in the area $c$ a negative image of the subject on an opaque background, and in the area $d$ a positive image on an opaque background.

He then exposes another sensitive film, which has been treated for the photo-chemical destruction of the latent images and carrying the latent positive image of the background or landscape, to the following luminous effects:

1. To the action of red light through the intermediate image $c$, which destroys the latent image of the background in the parts corresponding to the shadows of the subject.

2. To the action of red light, through the intermediate image $d$, thus destroying the latent image of the background in the parts corresponding to the high-lights of the subject.

3. To the action of blue light, through the intermediate image $c$, thus producing a positive latent image of the subject.

After developing the film thus exposed, the desired composite image is obtained.

It will be observed that in this third example, the intermediate images $c$ and $d$ are formed on the same film, and the same is true for the negatives $a$ and $b$, and thus, as explained for the second example, the differences of contraction or like distortion are reduced to a minimum.

It will be further noted that it is not necessary to effect the focusing simultaneously for several optical systems. The exposures of the direct and selected negatives $a$ and $b$ require only one focusing of the view taking apparatus. In like manner, the transfer of the negatives $a$ and $b$ to the intermediate film in order to obtain the images $c$ and $d$ requires simply that the film of the negatives and the film of the intermediate images shall be placed in conjugate planes with respect of a single optical system, and the same is true when producing the composite image itself on the final film by means of the intermediate film.

The application of the method according to the invention to cinematography, is at once apparent from the aforesaid description. All the groups of two negatives $a$ and $b$, corresponding to each position of the scene to be reproduced, will come in succession upon a given film. The same is true for all the groups of two intermediate images corresponding to these groups of negatives.

It is obvious that the above explanations are given solely by way of example. The positives may be replaced by negatives, and the negatives by positives. The exposed emulsions can be developed by the reversal process. Instead of exposing the films to red light and to blue light, it is feasible, according to the treatments given to the films, to employ two other kinds of light which have contrary effects upon the emulsion, one of these producing a latent image and the other destroying this latent image.

Another advantage of the invention consists in the fact that it may be applied to composite images formed of more than two partial images, and in this case it is not necessary to perform double operations of printing.

The invention is applicable not only to photography and to cinematography, but to all cases of copying or of reproduction, whether optical or by direct contact, which have hitherto required the use of additional masks, such as for the production of wipes, for the introduction of models, and the like. It is further applicable, in preference to chemical processes, to the production of fades and dissolves by varying the intensity of the exposures to red light and to blue light.

Having now described my invention what I claim as new and desire to secure by Letters Patent is:

1. A method for producing a composite image on a sensitive layer adapted, after having been fogged by exposition to a first kind of light, to be restored in its sensitiveness by a second kind of light, which consists in preparing a negative of a first component, preparing a positive and a negative of a second component, exposing a surface of said layer to said first kind of light through said negative of said first component, restoring the sensitiveness of said layer in part of said surface by exposing said part of said surface to said second kind of light successively through said positive and said negative of said second component and by simultaneously preventing exposure of the other parts of said surface, exposing said part of said surface to said first kind of light through said negative of said second component, and developing said sensitive layer.

2. A method according to claim 1, in which said positive and said negative of the second component are prepared on the same film.

LEONTI PLANSKOY.